Figure 1:
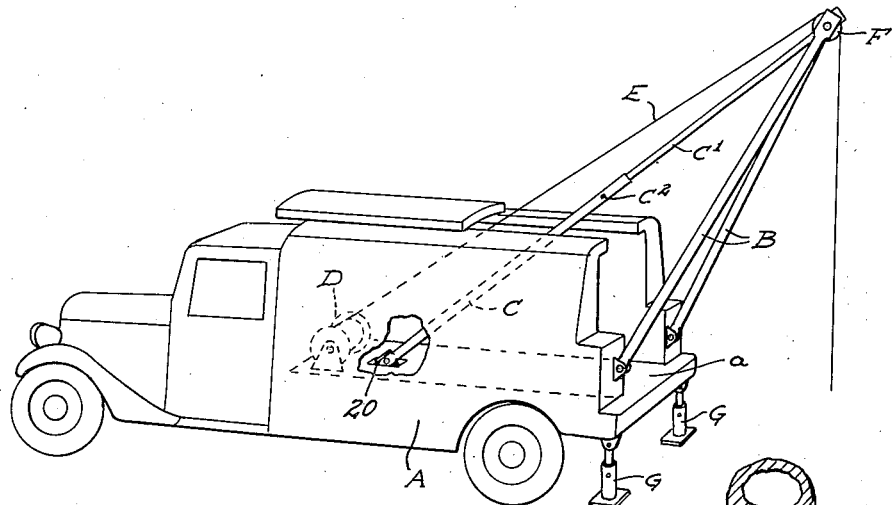

Oct. 7, 1941.  H. J. TROCHE  2,257,873

DERRICK ANCHORAGE

Filed Oct. 2, 1940

INVENTOR.
Herman J. Troche,
BY Balis, Tear & McBean,
Attorneys.

Patented Oct. 7, 1941

2,257,873

UNITED STATES PATENT OFFICE 2,257,873

DERRICK ANCHORAGE

Herman J. Troche, Cleveland Heights, Ohio, assignor to The American Coach & Body Company, Cleveland, Ohio, a corporation of Ohio Application October 2, 1940, Serial No. 359,390

11 Claims. (Cl. 212—145)

This invention relates to a mechanism for effectively anchoring the lower end of the middle leg or strut of a derrick, enabling the ready attachment of such leg so it may extend at various angles and be effectively held whether it is in compression or tension. More particularly, my anchorage is adapted for mounting in an opening in a floor and when not in use having its top substantially flush with the floor.

My anchorage is especially well adapted for utility vehicles of the type which carry derrick legs at the rear end and have the middle leg extending into the interior of the vehicle when the derrick is in use, and it is one of the objects of the invention to provide a single and effective anchorage attached to the chassis frame of such vehicle and adapted to engage and hold the lower end of the strut which leads upwardly and rearwardly to the top of the derrick legs. In transportation, the derrick legs are usually removed and stored within the vehicle, and the workmen also ride within the vehicle, so that it is very desirable to leave the floor space in the vehicle unobstructed as much as possible, and the anchorage provided by my invention accomplishes that result.

My invention is illustrated in the drawing hereof, and is herein more fully explained, and the essential novel features are set out in the claims.

Figure 2:
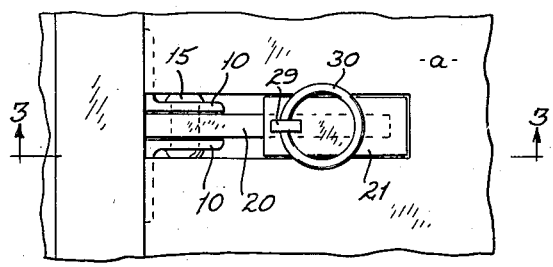
Figure 3:
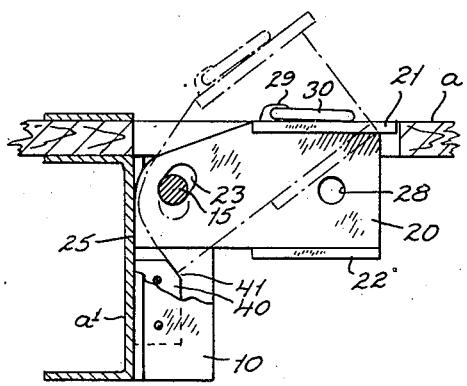
Figures 4, 5:
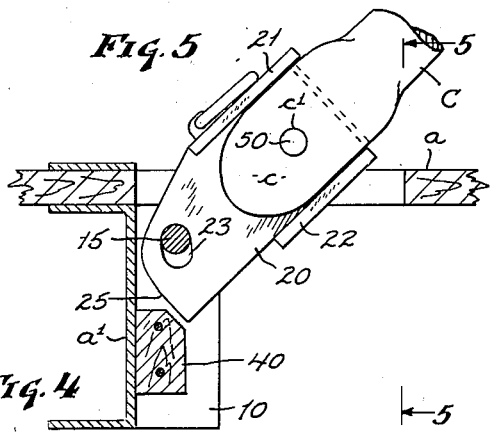

In the drawing, Fig. 1 is a perspective, partly broken away, of a utility vehicle having a derrick with the middle leg anchored by the device of the invention; Fig. 2 is a plan of a portion of the floor of the vehicle, showing the anchorage in its idle position; Fig. 3 is a vertical section in a plane indicated by the line 3—3 of Fig. 2, showing the anchorage in full lines in idle position and in broken lines in one of its active positions; Fig. 4 is a similar view, showing the anchorage in another active position; Fig. 5 is a vertical section at right angles to Figs. 3 and 4 looking toward the anchorage, as indicated by the line 5—5 of Fig. 4.

In Fig. 1 is shown a utility vehicle A having a floor $a$, two derrick legs B pivotally mounted at the rear of the vehicle, and a telescopic strut or middle leg $CC^1$ leading from the floor of the vehicle to the top of the derrick legs B. The strut shown is composed of a lower tubular rod C and an upper rod $C^1$ telescoping into the tube C and adjustably secured to it by cross pin C—2. Within the utility vehicle at the front end of the floor $a$, I have shown a winch D from which a cable E leads over a pulley F at the junction of the legs B and the rod $C^1$. The vehicle is shown as supported at its rear by jacks G.

In such a construction as described, the telescopic rod $CC^1$ when there is no load on the cable is in tension due to the out-component of the weight of the outwardly extending derrick legs B. When the winch is operated to raise a load of considerable weight, the tension on the cable may result in a downwardly inclined force in a direction forward of the derrick legs, thus putting the tie $CC^1$ into compression. It is necessary, therefore, for the anchorage to provide for the attaching of a comparatively stiff member which will resist diagonally downward compression strains as well as diagonally upward tension strains. This is accomplished by my anchorage, which will now be described with particular reference to Figs. 2 to 5.

Secured to a cross-beam $a^1$ of the vehicle (which may be a channel with its web vertical) are a pair of brackets, preferably vertical angle bars 10 having rearwardly projecting flanges parallel and spaced apart. Extending between the angle bars and loosely pivoted to them by a transverse pin or rivet 15, is the attaching member of my anchorage device. This member comprises a plate-like portion 20 lying in a vertical plane and provided with flanges at the top and bottom. The top flanges 21 extend from the opposite sides of the plate 20 in alignment with each other, and with their top surfaces aligning with the top edge of the plate, while at the bottom I have shown one plate-like flange 22 extending across the bottom of the plate 20. The result is to provide a member which adjacent its free end is I-shaped in cross section, such member being preferably a single steel casting or forging.

The anchorage member described, by reason of its I-shaped cross section, provides two open sockets adapted to receive the bifurcated lower end of the strut rod C, such bifurcation providing two plate-like extensions $c$ of the rod which lie on the opposite sides of the plate 20 and between the flange 21 and 22, and are attached to the plate by a transverse pin.

As heretofore stated, the anchorage member is loosely pivoted to the angle bars 10 by a rivet 15 which is carried by the angle bars. This rivet extends through a slot 23, in the member, the slot being of special length and direction as hereinafter explained.

The anchorage plate 20 terminates at its inner end in a surface 25 which is at right angles to the flange 21 and 22. When the device is idle, this inner end abuts the chassis beam $a^1$ as indicated in Fig. 3, and in this position the bottom wall of the slot 23 is bearing against the rivet 15. The slot is inclined in an upward direction toward the free end of the plate 20, and the length of the plate 20 and the position of the rivet is such that in this idle position the top of the flange 21 is maintained flush with the top of the floor $a$ of the vehicle, as shown in full lines in Fig. 3.

It will be seen that when the anchorage device is idle, it presents practically no obstruction to the interior of the vehicle. I may provide a lift ring 30 which extends through an eye 29 rising a short distance from the top of the plate 20, and these are the only parts above the floor and extend such a short distance as to be negligible. Accordingly, the entire interior of the vehicle is available for the storage of the derrick parts or other tools or for occupancy by the attendants.

When the derrick is assembled the anchorage device is lifted from its idle position, by means of the lift ring 30, rocking it about the pivot 15. When it has reached an angle to the floor about as shown in broken lines in Fig. 3, the slot 23 becomes substantially vertical and the inner end of plate 20 is free to drop a short distance. Now when the anchorage device is released by the operator, the surface 25 of plate 20 rests against the beveled surface 41 of a block 40, secured between the angle bars 10. At this time the free end of the device protrudes above the floor as shown in Fig. 3, and the bifurcated end of the derrick leg C may be slid along the floor and into the open pockets previously described as provided by the I-shaped cross-section of the device. As they enter the pockets the extensions $c$ of the leg cam the device upwardly from its broken line position of Fig. 3 to some such position as shown in Fig. 4.

As previously indicated, the strut rod C is attached to the socket member by a transverse pin extending through registering holes $c'$ in the rod and 28 in the web 20 of the socket member. Such a pin is indicated at 50 in Fig. 5 and may have a looped handle portion 51 and an eccentrically pivoted end portion 52 which, after insertion, can be turned out of registration with the shank of the pin to provide a stop, as indicated in Fig. 5.

After the derrick leg C is pinned to the socket member, the latter becomes, in effect, an integral part of it and assumes such varying angles as may be given to the leg C by reason of its telescopic adjustment. The minimum operating angle is greater than that of the socket member at rest against the block 40 so that at all times the plate 20, when active, is free of the block 40 and also of the frame member $a'$, regardless of whether the strut is placed in tension or compression and the pivot 15 is at the bottom or top, respectively, of the slot 23.

When the derrick is disassembled the pin 50 is removed and the strut C withdrawn, at which time the operator may lift the socket member by means of the ring 30 until the lower corner of the plate 20 clears the block 40. Then, by maintaining tension on the pivot 15, and allowing the free end to swing downwardly about it, the socket member is returned to idle position of Fig. 3.

It will be seen that my anchorage construction is very simple. It provides for effectively attaching the lower end of the middle leg and effectively resisting the downward and upward stresses therein in use, whatever be the position of the derrick. The middle leg is very conveniently attached to the anchorage or detached therefrom when the derrick is to be stored. When so stored, the anchorage member is practically entirely beneath the floor with the surface of its top flange flush with the floor, so that there is no material obstruction on the floor or reduction of the carrying capacity of the vehicle.

I claim:

1. The combination of a utility vehicle having a floor, derrick legs pivotally carried at the rear of the vehicle adapted to extend in an inclined direction upwardly and outwardly, a strut member connected at its upper end to the derrick legs, and an anchorage device for said strut member which device is pivotally mounted on a frame member of the vehicle and has a portion I-shaped in cross section, the lower end of said strut member being bifurcated at its end to provide wings embracing the web of such I-shaped portion.

2. A combination of a utility vehicle, derrick legs carried thereby, a telescopic derrick strut connected at its upper end to the legs, an attaching device pivotally connected to a fixed member on the vehicle adapted to receive directly the lower end of the strut and align with it though it may extend at various angles to the horizontal and means for resisting the diagonally downward thrust on the attaching member when in use, the attaching member being so mounted on the vehicle that when idle it may be substantially beneath the floor level of the vehicle.

3. A combination of a utility vehicle, derrick legs carried thereby, a telescopic derrick strut connected at its upper end to the legs, an attaching device pivotally connected to the vehicle adapted to receive the lower end of the strut, said attaching device being formed with a web and top and bottom flanges providing a socket to receive the lower end of the strut, and means for resisting the diagonally downward thrust of the attaching member when in use.

4. The combination of a vehicle having a cross beam, a pair of brackets secured to the cross beam spaced apart and carrying a pin, an anchorage device having a plate-like portion extending between the brackets and having a slot extending around the pin, said anchorage device having means for the attachment of the lower end of a derrick strut, and a block carried by the vehicle beam between the brackets adapted to be abutted by the plate-like portion of the anchorage device.

5. The combination of a utility vehicle having a floor with an opening in it, a beam beneath the floor adjacent the opening, said beam carrying a cross pin, an attaching member having a slot embracing the cross pin, the slot inclining toward the free end of the member and the pin and beam being so spaced with relation to the slot and the pivoted end of the member that when the member is horizontal its end abuts the beam with the pin at one end of the slot and when the member is inclined the pin is at the other end of the slot, the member being formed adjacent its free end for attachment of a derrick strut.

6. The combination of a vehicle having a cross beam, a pair of brackets secured thereto and spaced apart, a cross pin carried by the brackets, an anchorage device having a plate portion extending between the brackets and provided with a slot extending around the pin, the end of the plate portion being formed to abut the beam of the vehicle and support the anchorage device in a substantially horizontal position, there being means providing an abutment for the anchorage device when it is in an upwardly inclined position, the anchorage device having lateral flanges at its top and bottom to provide open sockets for receiving the bifurcated end of a derrick strut.

7. An anchorage device for a derrick strut comprising a support associated with a floor, a movable member pivoted on the support, abutment means to support the member subtsantially flush with the floor while idle, a second abutment means to support the member above the floor for engagement by the derrick strut, and means to attach the member rigidly to the strut whereby the member assumes the angle of the strut free of either of the abutment means.

8. An anchorage device for a derrick strut comprising a support associated with a floor, a substantially horizontal pin carried by the support, a movable member having a slot embracing the pin, the member being adapted to abut a portion of the support when the pin is at one end of the slot to support the member in an idle position substantially flush with the floor and to abut a second portion of the support when the pin is at the other end of the slot to support the member in an elevated position, and means to attach the member rigidly to the derrick strut, the member being adapted to be pivoted about said other end of the slot by the derrick strut when so attached.

9. A derrick anchorage comprising a support associated with a floor, a member loosely pivoted to the support, there being surfaces on the member and support adapted to abut and thereby hold the member idle in an opening in the floor with its top substantially flush with the floor, said member being adapted to be swung upwardly through the opening in the floor, and means for attaching a derrick strut or tie to said upwardly swung member beneath its top.

10. The combination of a support comprising a beam, a floor above the beam supported by it and having an opening through it, a transverse pin carried by the beam, an attaching member having an opening through which said pin extends, means for holding the member with its top substantially horizontal when the member is swung down through an opening in the floor, and means accessible above the floor for lifting it into a position inclined upwardly.

11. The combination of a vehicle having a floor, a three-legged derrick having its two extreme legs pivoted to the vehicle, an anchorage device for the middle leg of said derrick comprising a support beneath the floor and a movable member mounted on the support and adapted to swing upwardly through an opening in the floor, means for securing the said middle leg to the movable member, the movable member having a portion adapted to abut the support and hold the movable member when idle with its top substantially horizontal, there being means for resisting the diagonally downward stress on the movable member when inclined.

HERMAN J. TROCHE.